(12) United States Patent
Uchiyama et al.

(10) Patent No.: US 9,061,601 B2
(45) Date of Patent: Jun. 23, 2015

(54) VEHICLE

(71) Applicant: HONDA MOTOR CO., LTD., Tokyo (JP)

(72) Inventors: Hajime Uchiyama, Higashikurume (JP); Hiroyuki Nishimori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/224,444

(22) Filed: Mar. 25, 2014

(65) Prior Publication Data

US 2014/0292027 A1  Oct. 2, 2014

(30) Foreign Application Priority Data

Mar. 29, 2013  (JP) ................. 2013-073128

(51) Int. Cl.
 *B62D 25/20*  (2006.01)
 *B60N 2/00*  (2006.01)
 *B60J 5/04*  (2006.01)

(52) U.S. Cl.
 CPC  *B60N 2/00* (2013.01); *B60J 5/0487* (2013.01)

(58) Field of Classification Search
 CPC .......... B60N 2/00; B60J 5/0487; B60J 5/0413
 USPC ............... 296/65.01, 63, 69, 169, 174, 184.1, 296/183.1
 See application file for complete search history.

(56) References Cited

U.S. PATENT DOCUMENTS

| | | | |
|---|---|---|---|
| 4,005,898 A | 2/1977 | Way | |
| 4,366,978 A | 1/1983 | Hamatani | |
| 4,750,778 A | 6/1988 | Hoban | |
| 4,911,493 A | 3/1990 | Muirhead | |
| 5,029,928 A | 7/1991 | Huber | |
| 5,037,154 A | 8/1991 | Senba et al. | |
| 5,368,354 A | 11/1994 | Martin | |
| 5,383,707 A | 1/1995 | Osenkowski et al. | |
| 5,398,985 A | 3/1995 | Robinson | |
| 5,505,513 A | 4/1996 | Carsner | |
| 5,741,046 A | 4/1998 | Leuchtmann et al. | |
| 5,979,964 A | 11/1999 | Ban et al. | |
| 5,984,397 A | 11/1999 | Dawson et al. | |
| 6,158,800 A | 12/2000 | Tsuge et al. | |
| 6,237,981 B1 | 5/2001 | Selleck | |
| 6,318,784 B2 * | 11/2001 | Nishide | 296/65.09 |
| 6,481,772 B1 | 11/2002 | Tenn | |
| 6,540,272 B2 | 4/2003 | Spurr | |
| 6,557,882 B2 | 5/2003 | Harrington | |
| 6,655,738 B2 | 12/2003 | Kammerer | |
| 6,733,078 B1 | 5/2004 | Zelmanov | |
| 6,905,159 B1 | 6/2005 | Saito et al. | |
| 6,908,137 B2 | 6/2005 | Doxey et al. | |
| 6,945,585 B1 | 9/2005 | Liu et al. | |
| 6,994,388 B2 | 2/2006 | Saito et al. | |
| 7,021,689 B1 | 4/2006 | Weisbeck, III | |

(Continued)

OTHER PUBLICATIONS

U.S. Appl. No. 13/760,272; Titled: Vehicle with Pivoting Seat Back and Stopper Member; filed Feb. 6, 2013; Inventors: Casey Heit et al.

*Primary Examiner* — Lori L Lyjak (74) *Attorney, Agent, or Firm* — Clifford B Vaterlaus (57) ABSTRACT

A vehicle includes a cargo area having folding seats and rear doors. The rear doors are provided with a seat stopper on an inner side. The seat stopper presses a seat back plate from above when the door is closed and the seat back plate is folded down to prevent the seat back plate from being lifted.

20 Claims, 7 Drawing Sheets

(56) References Cited

U.S. PATENT DOCUMENTS

| | | |
|---|---|---|
| 7,152,926 B2 | 12/2006 | Wrobel |
| 7,188,906 B2 | 3/2007 | Christoffel et al. |
| 7,240,949 B1 * | 7/2007 | Moushegian et al. ...... 296/65.01 |
| 7,249,798 B2 | 7/2007 | Saito et al. |
| 7,416,238 B2 | 8/2008 | Houston |
| 7,578,544 B1 * | 8/2009 | Shimamura et al. ....... 296/183.2 |
| 7,636,985 B2 | 12/2009 | Greenbank |
| 7,658,430 B2 | 2/2010 | Zielinski et al. |
| 7,717,495 B2 | 5/2010 | Leonard et al. |
| 7,735,896 B2 | 6/2010 | Kubota |
| 7,762,621 B2 | 7/2010 | Duller |
| 7,854,461 B2 * | 12/2010 | Yamada ..................... 296/65.05 |
| 7,874,606 B2 | 1/2011 | Yamamura et al. |
| 8,002,331 B2 | 8/2011 | Bowers |
| 8,075,040 B2 | 12/2011 | Arnold |
| 8,196,990 B2 | 6/2012 | Aebker et al. |
| 8,215,690 B2 * | 7/2012 | Nishiike et al. ............ 296/24.43 |
| 8,313,133 B2 | 11/2012 | King |
| 8,328,261 B2 | 12/2012 | Kanazawa et al. |
| 8,348,322 B2 | 1/2013 | King |
| 8,353,552 B2 | 1/2013 | Scheurer, II et al. |
| 2002/0047287 A1 * | 4/2002 | Kawasaki ....................... 296/64 |
| 2009/0127886 A1 | 5/2009 | Stortzum |
| 2011/0148146 A1 * | 6/2011 | Takaya et al. .............. 296/183.1 |
| 2012/0025557 A1 | 2/2012 | Lindsay et al. |
| 2012/0161468 A1 | 6/2012 | Tsumiyama et al. |
| 2012/0193931 A1 | 8/2012 | King |
| 2012/0193932 A1 | 8/2012 | King |

* cited by examiner

VEHICLE

CROSS REFERENCES TO RELATED APPLICATIONS

The present application claims priority under 35 U.S.C. §119 to Japanese Patent Application No. 2013-073128, filed Mar. 29, 2013, entitled "Vehicle," the contents of which are incorporated herein by reference in their entirety.

BACKGROUND

1. Field

The present disclosure relates to a vehicle, and particularly relates to an improvement of an off-road vehicle.

2. Description of the Related Art

Various different types of vehicles are known that are configured for traveling off-road or on rough road surfaces. Some off-road vehicles are provided with side-by-side seats and a cargo deck behind the seats. In some situations, the cargo decks can also be used as part of a seat. The cargo decks may be folded into different configurations for either carrying cargo or forming passenger seats.

In addition, rear doors may be provided at the rear of the vehicle near the cargo deck to provide access to passenger seats or the cargo deck. The doors may be hinged to open and close.

The cargo deck may be required to be locked in position when folded to either carry cargo or form passenger seats. The locking mechanism that locks the cargo deck or passenger seats in place is known to increase the number of parts required for the vehicle, and to increase the cost for the vehicle.

SUMMARY

The present disclosure describes a vehicle in which it is possible to reduce the number of components of seat lock mechanisms that maintain seat back plates in a folded state and to achieve cost reduction.

According to an aspect of the present disclosure, there is provided a vehicle including a vehicle body frame; seat cushions which are provided on the vehicle body frame and on which an occupant sits; seat back plates which are forward foldably attached to the seat cushions via folding mechanisms and are folded to form a cargo deck; and doors which are openably and closably provided on the vehicle body frame on outer sides of the seat cushions in a width direction of the vehicle. Rear portions of the doors are attached to the vehicle body frame via hinges, and the doors are provided with seat stoppers which, when the doors are closed, press the seat back plates from above to prevent the seat back plates from being lifted.

Since the doors are provided with the seat stoppers, seat lock mechanisms which are configured to have a plurality of components are not required. As a result, it is possible to reduce the number of components of seat lock mechanisms that maintain the seat back plates in a folded state and to achieve cost reduction.

In addition, since the hinges are provided in the rear portions of the doors, the hinges are positioned close to positions where the folding mechanisms of the seat back plates are located. When the seat back plates are folded, the closer the seat back plates are positioned to the folding mechanisms, the less the seat back plates are lifted. When the doors are closed, portions of the doors that are closest to the hinges first come into contact with the seat back plates. For this reason, the seat stoppers can press vehicle rear-portion sides of the seat back plates where uplifts are small. As a result, when the doors are closed, loads which press the seat back plates can be reduced, and burdens exerted on the doors can be reduced.

In this aspect, the seat back plates may have upper protrusions and upper portions of the upper protrusions may be protruded to outer sides in the width direction of the vehicle further from lower portions thereof when the seat back plates are erected, and the upper protrusions may be pressed by the seat stoppers.

Since only the upper portions of the seat back plates are protruded, the overall sizes of the seat back plates may be reduced.

In addition, since the seat back plates have a plate shape and are lighter than the doors, it may be possible to reduce an overall weight of the vehicle by protruding the seat back plates rather than the doors.

In this aspect, stopper surfaces of the seat stoppers may be sloped surfaces which are sloped upwards toward inner sides in the width direction of the vehicle.

When the doors are closed, the sloped surfaces come into contact with the seat back plates. Since the doors are closed while the doors press the seat back plates, the doors may be smoothly opened and closed.

In this aspect, the doors may have recesses which are concaved toward the outside from the inner sides in the width direction of the vehicle.

Since a volume on an inner side of the vehicle is larger due to the recesses, it may be possible to increase storage portions which are located in lower portions of the seat back plates.

In this aspect, the recesses may be continuously arranged below the seat stoppers, and upper ends of the recesses may be connected to the stopper surfaces.

The seat stoppers may be protruded in the width direction of the vehicle and may be formed to be long in a front and rear direction of the vehicle. Since the seat stoppers serve as ribs, strengths of the doors may be increased.

In this aspect, the cargo deck may have side-portion cargo deck frames on side portions in the width direction of the vehicle. Front portions of the side-portion cargo deck frames may be configured to have the doors, and rear portions thereof may be configured to have rear-portion frames which are attached to the vehicle body frame. The doors may be attached to the rear-portion frames via the hinges, and the seat stoppers may be arranged on the outer sides in the width direction of the vehicle further from the rear-portion frames.

Thus, cargo first comes into contact with the rear-portion frames when the cargo is loaded on the cargo deck from a rear of the vehicle. As a result, the rear-portion frames may protect the seat stoppers from the loading of the cargo.

In this aspect, the seat cushions may be divided at a center in the width direction of the vehicle to configure the left seat cushion in the left of the vehicle and the right seat cushion in the right thereof. The vehicle body frame may have a center frame which is provided between the left seat cushion and the right seat cushion and is extended in the front and rear direction of the vehicle. An upper surface of the center frame and back surfaces of the folded seat back plates may form a continuous surface.

Thus, the rear center frame may take a load of the cargo. As a result, burdens on the seat back plates caused by the load of the cargo may be reduced.

In this aspect, the seat back plates may have a wave-shaped cross-section when the seat back plates are viewed from a cut out in the width direction of the vehicle.

Since the seat back plates are formed to have a corrugated structure, strengths of the seat back plates may be improved, and strength of the cargo deck may be improved.

DETAILED DESCRIPTION

Hereinafter, embodiments of the present disclosure will be described with reference to the accompanying drawings. The drawings are considered to be seen in an orientation of reference signs as depicted in the drawings.

Figure 1:
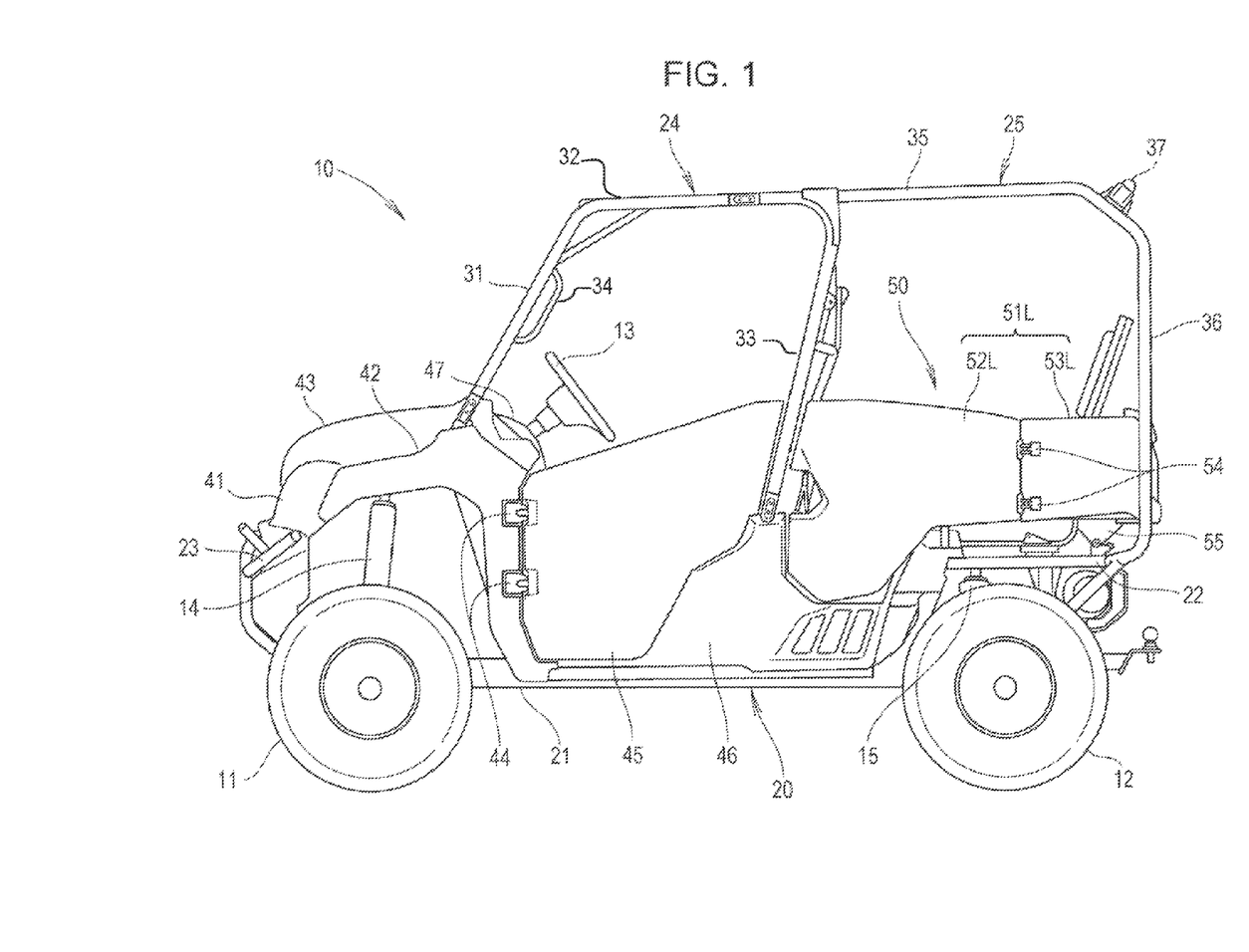
FIG. 1 is a left side view of a vehicle according to one embodiment of the present disclosure.

As illustrated in FIG. 1, a vehicle 10 is shown. The vehicle 10 may be an off-road left-hand drive vehicle equipped with a 4-wheel independent suspension which can travel on uneven ground. Left and right front wheels 11 may be independently suspended in a front portion of a vehicle body frame 20, and left and right rear wheels 12 may be independently suspended in a rear portion of the vehicle body frame 20. It will be appreciated however, that the vehicle 10 may have various different configurations within the scope of the present disclosure. For example, the steering wheel 13 is shown to be provided on the left of the vehicle, but the steering wheel 13 is not necessarily provided on the left and could be provided in the center or on the right side of the vehicle.

The vehicle body frame 20 has a center frame 21 which is arranged in a center portion in a width direction of the vehicle and is extended in a front and rear direction of the vehicle; a rear frame 22 which is extended above the center frame 21 from a center portion thereof to a rear and in parallel with the center frame 21; a bumper 23 which is provided in a tip portion of the center frame 21 to protect the front portion of the vehicle 10; a front roll bar 24 which is provided in a front upper portion of the center frame 21 and has a substantially arch shape when seen from a side view; and a rear roll bar 25 which is provided to be extended rearwards from a rear upper end of the front roll bar 24 and has a substantially inverted L shape when seen from the side.

In addition, the front portion of the vehicle 10 has a front cover 41 which is provided in a front end portion to cover a front end of the vehicle 10; a front fender 42 which is provided in a rear portion of the front cover 41 to cover the front wheel 11 from a top thereof to a rear; a front upper cover 43 which is provided in an upper portion of the front fender 42 to cover a front upper portion of the vehicle 10; and a front door 45 which is openably and closably provided in a rear portion of the front fender 42 via hinges 44.

A rear portion of the vehicle 10 has a side cover 46 which is arranged in a rear portion of the front door 45 to cover a side portion of the vehicle 10; and a side-portion cargo deck frame 51L which is arranged in a rear upper portion of the side cover 46 to form a cargo deck 50. A front portion of the side-portion cargo deck frame 51L is configured to have a rear door 52L and a rear portion thereof is configured to have a rear-portion frame 53L which is attached to the vehicle body frame 20. A rear side of the rear door 52L is openably and closably provided in a front end of the rear-portion frame 53L via hinges 54.

The cargo deck 50 is supported by the rear frame 22 via a stay 55. The front wheel 11 is supported by a front cushion 14, and the rear wheel 12 is supported by a rear cushion 15. An instrument panel 47 is provided in a rear of the front upper cover 43, and the steering wheel 13 is arranged in the vicinity of the instrument panel 47.

The front roll bar 24 has a front pillar 31 which is extended from the upper portion of the front fender 42 to the rear in a upward rising shape; a front roof side rail 32 which is extended rearwards from an upper end of the front pillar 31; a center pillar 33 which is extended downwards from a rear portion of the front roof side rail 32; and a frame-side grip 34 which is provided in the front pillar 31 for an occupant to grasp.

The rear roll bar 25 has a rear roof side rail 35 which is extended rearwards from an upper end of the center pillar 33; a rear pillar 36 which is extended downwards from a rear end of the rear roof side rail 35; and a top rear cross member 37 which is hung between rear portions of the left and right rear roof side rails 35.

The seats and the cargo deck on the rear portion will now be described.

Figure 2:
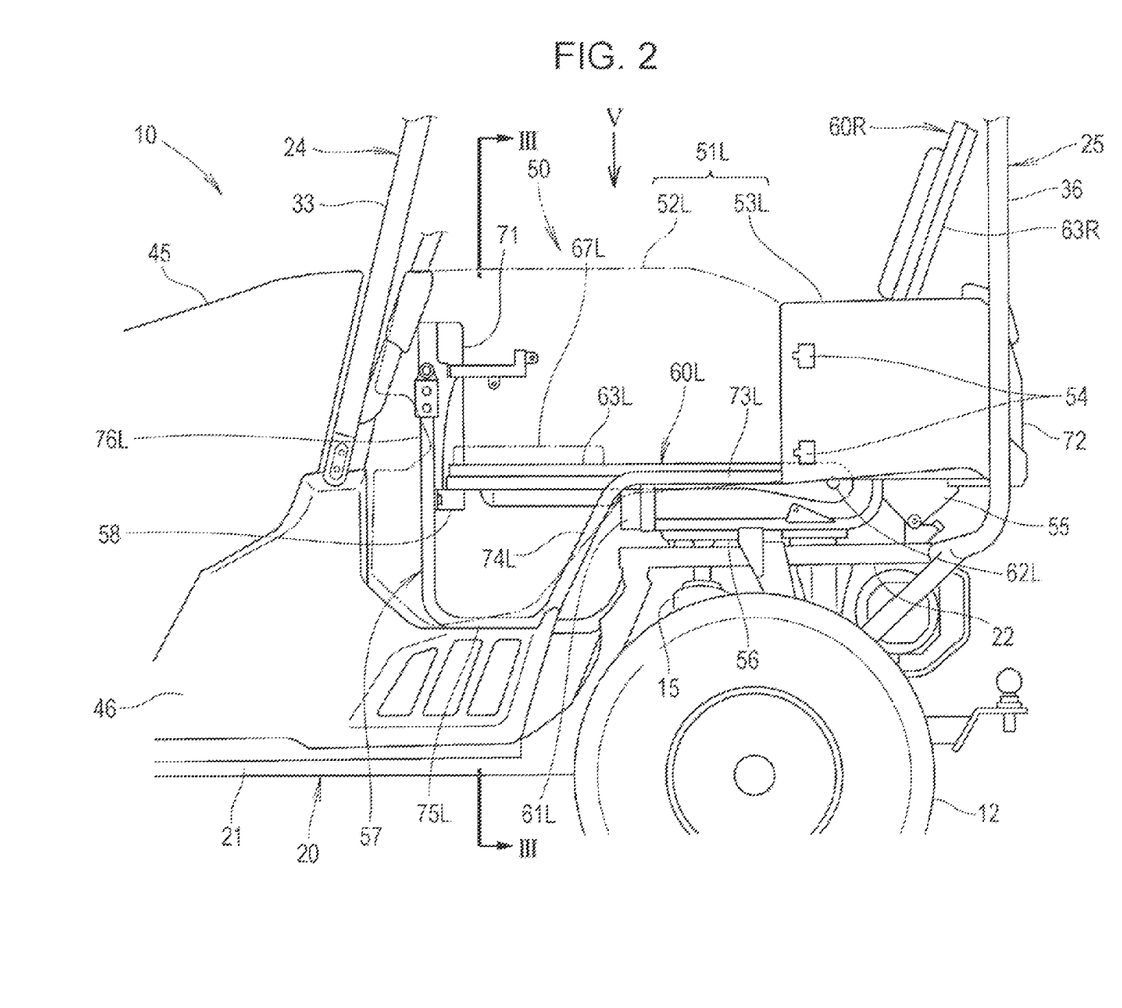
FIG. 2 is an enlarged view of certain portions in FIG. 1.

As illustrated in FIG. 2, a pair of left and right rear seats 60L and 60R (L indicates left and R indicates right throughout the specification) are provided in the rear portion of the vehicle 10. The left rear seat 60L is supported by the rear frame 22 via a seat stay 56, and the left rear seat 60L is configured to have a seat cushion 61L on which an occupant sits; and a seat back plate 63L which is forward foldably attached to a rear portion of the seat cushion 61L via a folding mechanism 62L and forms the cargo deck 50 when folded. The right rear seat 60R is also the same configuration as that of the left rear seat 60L.

The cargo deck 50 is configured to have left and right cargo deck frames 57L and 57R which are supported by the rear frame 22 and the stay 55; a cargo deck front cross member 58 which is hung between front portions of the left and right cargo deck frames 57L and 57R; seat back plates 63L and 63R which are folded to form a bottom of the cargo deck 50; left and right side-portion cargo deck frames 51L and 51R provided in the side portions in the width direction of the vehicle; a front-portion cargo deck frame 71 which is provided to connect front end portions of the left and right side-portion cargo deck frames 51L and 51R; and a rear-portion cargo deck frame 72 which is provided to connect rear end portions of the left and right side-portion cargo deck frames 51L and 51R.

The cargo deck frame 57L is configured to have a horizontal portion 73L which is substantially horizontally extended forwards from a front of the stay 55; a slanted portion 74L which is extended from a tip of the horizontal portion 73L in a forward descending shape; a bottom portion 75L which is extended forwards from a lower end of the slanted portion 74L; and a rising portion 76L which rises from a tip of the bottom portion 75L. The cargo deck front cross member 58 is provided in an intermediate portion in a top and bottom direction of the rising portion 76L. An upper end of the folded seat back plate 63L is supported by the cargo deck front cross member 58.

In addition, a door knob 77L is positioned inside the cargo deck 50 and on a front side of the rear door 52L, and the door knob 77L is fastened with an upper portion of the rising portion 76L.

Next, the seat back plate will be described.

Figure 3:
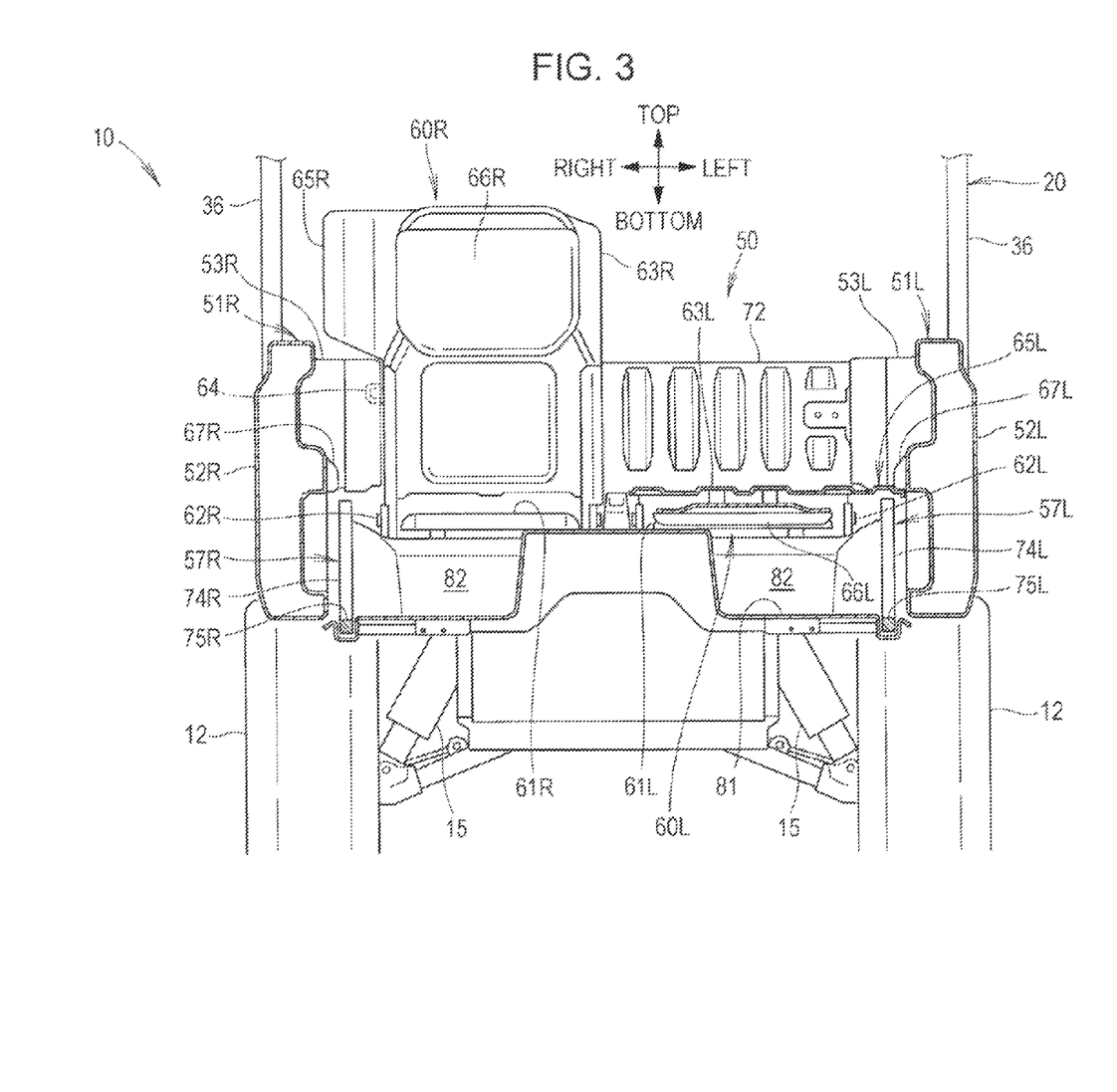
FIG. 3 is a cross-sectional view taken along III-III line in FIG. 2.

As illustrated in FIG. 3, a right seat back plate 63R is raised, and a striker 64 provided in the seat back plate 63R is fastened with the rear-portion frame 53L. The right seat back plate 63R has an upper protrusion 65R of which an upper portion is further protruded to the outer side than a lower portion in the width direction of the vehicle. In addition, a seat back 66R is provided in the seat back plate 63R.

A left seat back plate 63L is folded, and a storage portion 82 is formed between the seat back plate 63L and a floor 81. Similarly, the right seat back plate 63R may be folded, and thus, the storage portion 82 can be formed even on the right side.

Next, the seat back plate in a folded state will be described.

Figure 4:
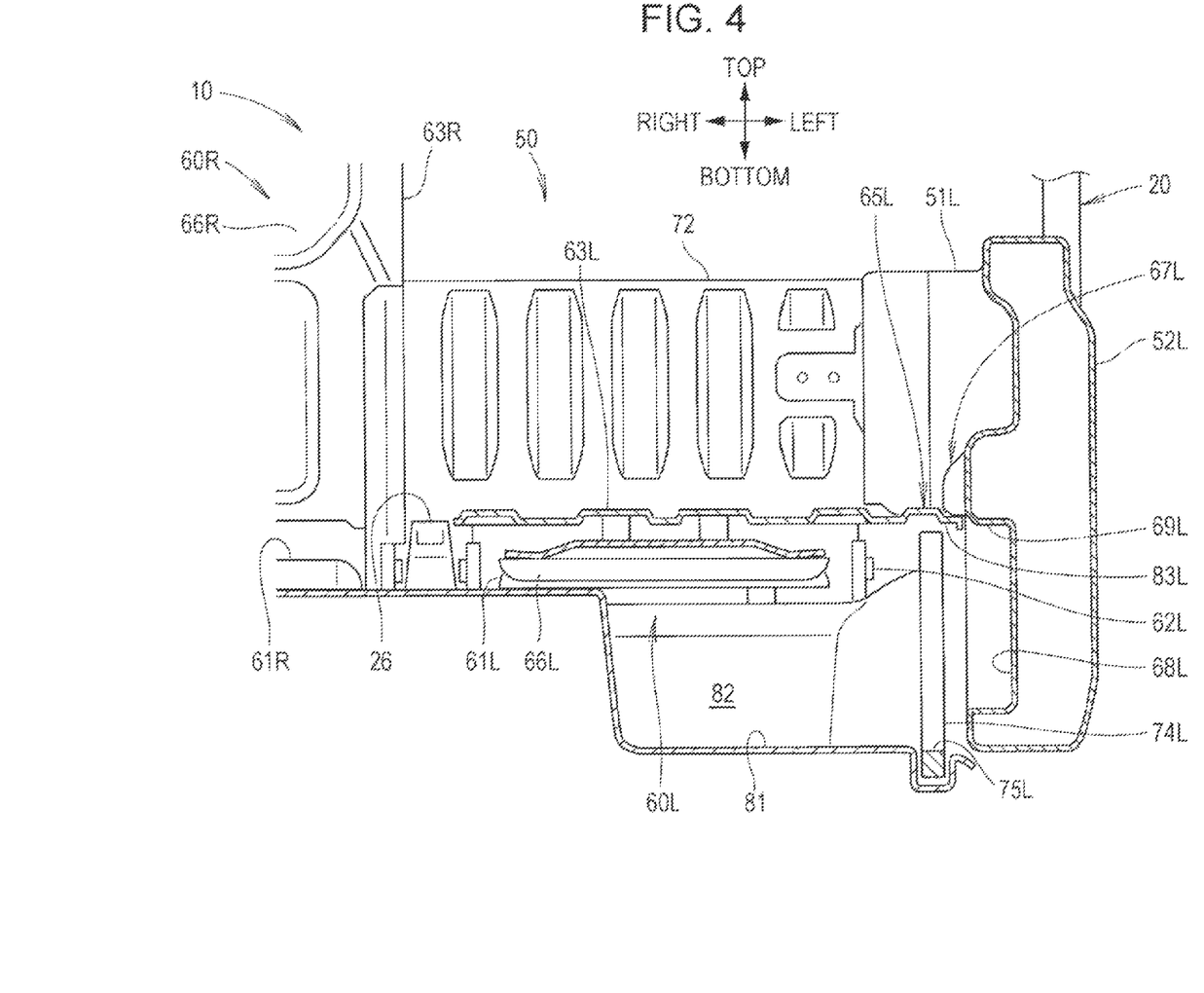
FIG. 4 is an enlarged view of certain portions in FIG. 3.

As illustrated in FIG. 4, the left rear door 52L is provided with a seat stopper 67L on the inner side in the width direction of the vehicle and in an intermediate portion in a top and bottom direction, and the seat stopper 67L presses the seat back plate 63L from above to prevent the seat back plate 63L from being lifted. Specifically, an upper protrusion 65L of the left seat back plate 63L is pressed by the seat stopper 67L. It will be understood that in some embodiments, the stopper 67L will merely overlie the seat back plate 63L without pressing the seat back plate 63L.

Since the seat stopper 67L has a simple shape and is only attached to the inner side of the rear door 52L, and thus, it is possible to reduce the number of components of a lock mechanism which locks the seat back plate 63L in a folded state and to achieve cost reduction.

In addition, the rear door 52L has a recess 68L which is concaved toward the outside from the inner side in the width direction of the vehicle. The recess 68L is provided, and thus, a space below the left seat back plate 63L can be larger, and the size of the storage portion 82 can be increased.

The recess 68L is continuously formed below the seat stopper 67L, and an upper end 69L of the recess 68L is connected to a stopper surface 83L of the seat stopper 67L. For this reason, the seat stopper 67L can serve as a rib and can reinforce the rear door 52L.

The seat back plate 63L has a wave-shaped cross-section when the seat back plate 63L is viewed from a cut out in the width direction of the vehicle. The wave shape is extended along a top and bottom direction of the seat back plate 63L. The seat back plate 63L is formed to have a corrugated structure, and thus, rigidity of the seat back plate 63L can be improved, and the cargo deck 50 can be reinforced. The wave-shaped cross-section of the seat back plate 63L is not limited to the shape as illustrated in FIG. 4. Rather, the seat back plate 63L can have an arc shape or other suitable shape. In addition, the number of waves, inter-wave intervals, and wave heights may be appropriately modified.

In addition, the vehicle body frame 20 has a rear center frame 26 at the center in the width direction of the vehicle, which is extended in the front and rear direction of the vehicle. The seat cushions 61L and 61R are provided in the left and the right, respectively, of the center in the width direction of the vehicle. The rear center frame 26 is arranged between the left seat cushion 61L and the right seat cushion 61R.

A back surface of the folded seat back plate 63L and an upper surface of the rear center frame 26 may be set to be at the same level to form a substantially continuous surface. Thus, the upper surface of the rear center frame 26 can be used as the bottom of the cargo deck 50, and forces exerted on the seat back plates 63L and 63R can be reduced when cargo is loaded.

Next, a positional relationship between the rear-portion frame and the seat stopper will be described with reference to a top view.

Figure 5:
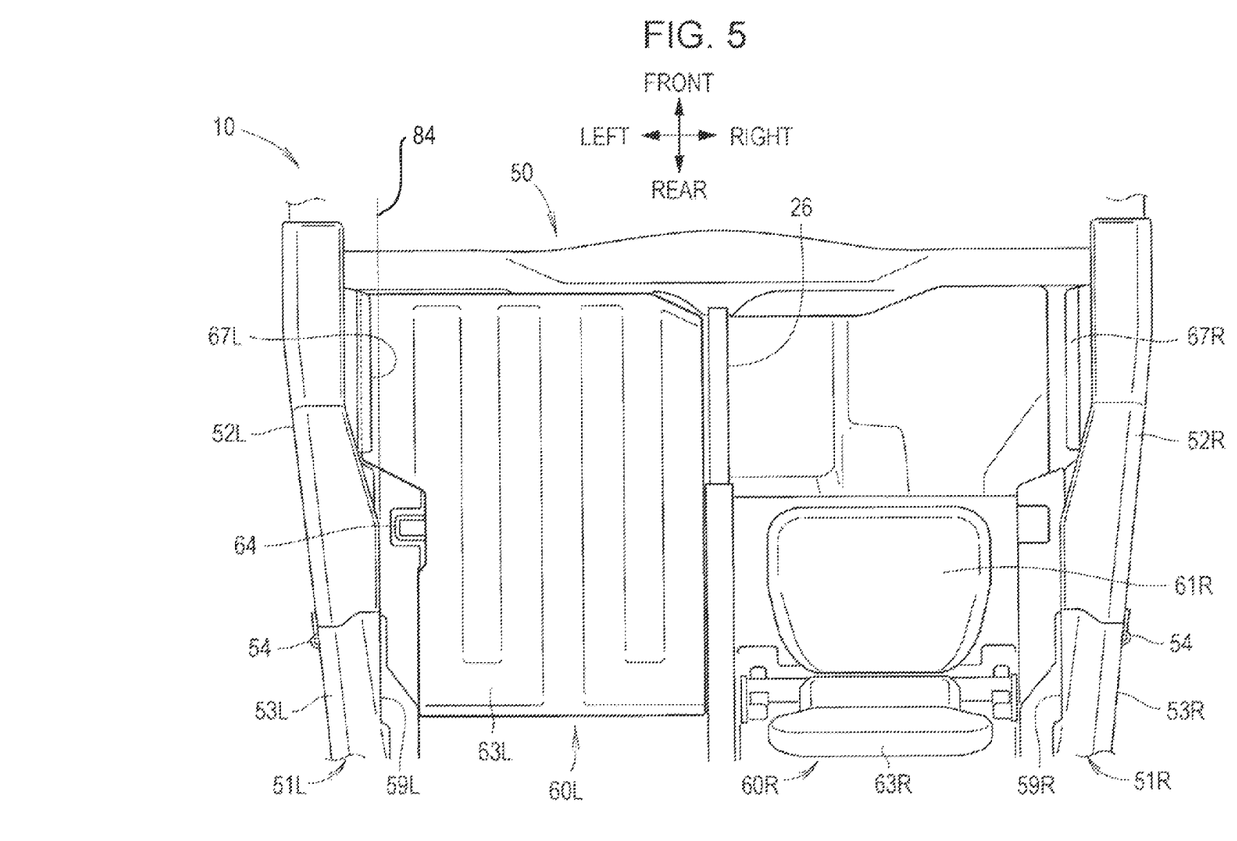
FIG. 5 is a view seen from a direction indicated by an arrow 5 in FIG. 2.

As illustrated in FIG. 5, an extension line 84 is defined as a line in which an inner surface 59L of the left rear-portion frame 53L is extended in the front and rear direction of the vehicle. An inner surface of the seat stopper 67L in the width direction of the vehicle is positioned on the outer side in the width direction of the vehicle further from the extension line 84. That is, the seat stopper 67L is arranged on the outer side in the width direction of the vehicle further from the rear-portion frame 53L.

When cargo is loaded on the cargo deck 50 from the rear portion of the vehicle, the cargo loaded in the vicinity of the side-portion cargo deck frame 51L first comes into contact with the rear-portion frame 53L. The cargo which is moved along the inner surface 59L of the rear-portion frame 53L passes through inside the seat stopper 67L in the width direction of the vehicle. Since the rear-portion frame 53L protrudes on the inner side in the width direction of the vehicle further from the seat stopper 67L, the rear-portion frame 53L can protect the seat stopper 67L from the loaded cargo.

Next, an operation of the above-described vehicle will be described.

Figure 6A:
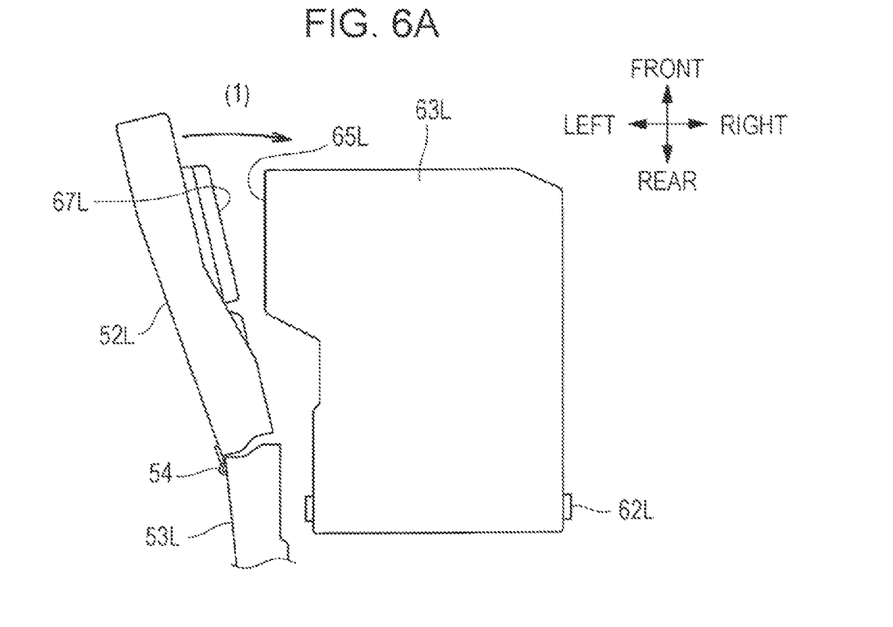
FIGS. 6A and 6B are views illustrating an operation of the vehicle door according to one embodiment of the present disclosure.
Figure 6B:
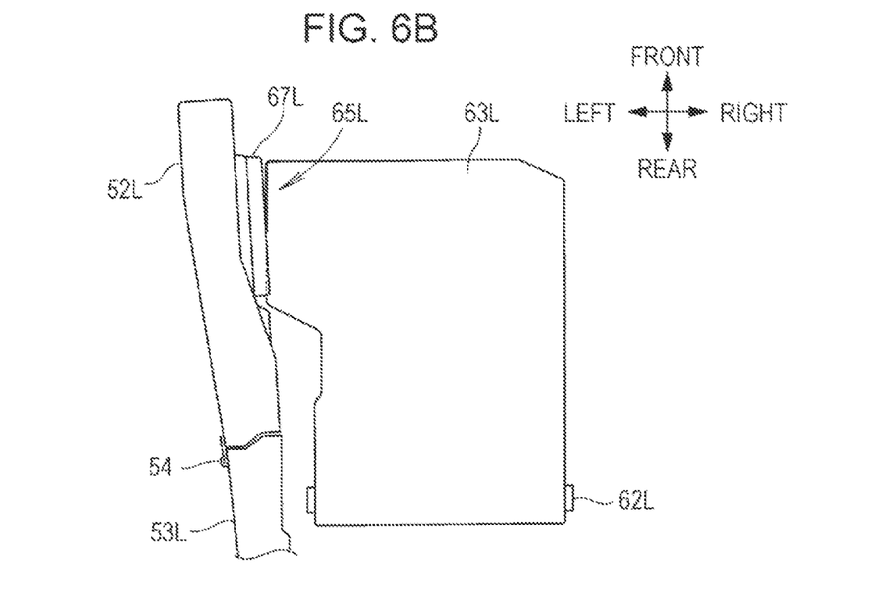

FIGS. 6A and 6B are top views illustrating a state where the seat back plate 63L is folded down. The rear door 52L is closed as illustrated by an arrow (1). As illustrated in FIG. 6B, the seat stopper 67L comes into contact with a side of the upper protrusion 65L which is closer to the folding mechanism 62.

Figure 7A:
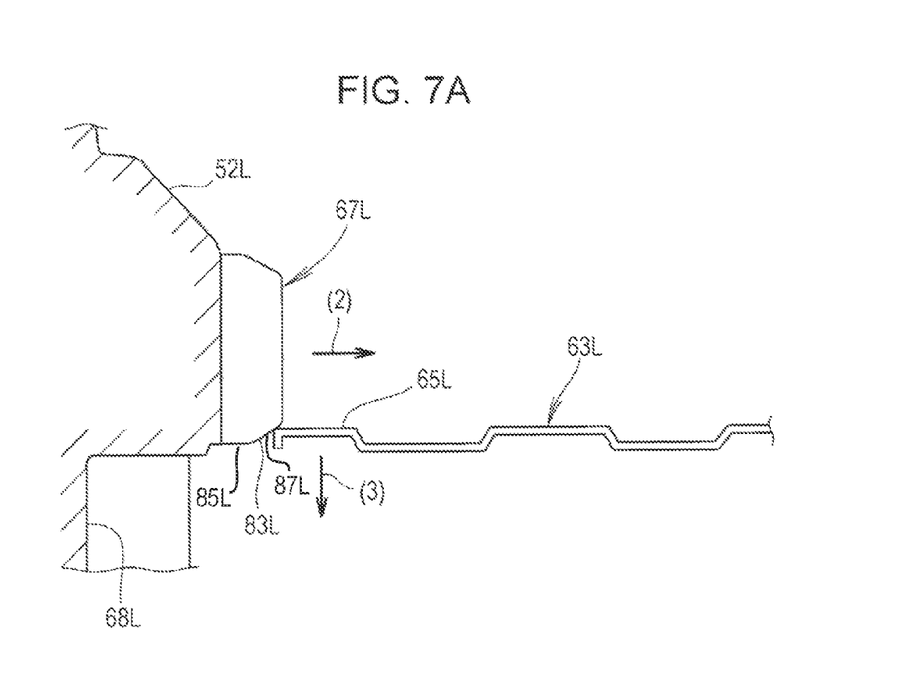
FIGS. 7A and 7B are views illustrating an operation of a seat stopper.
Figure 7B:
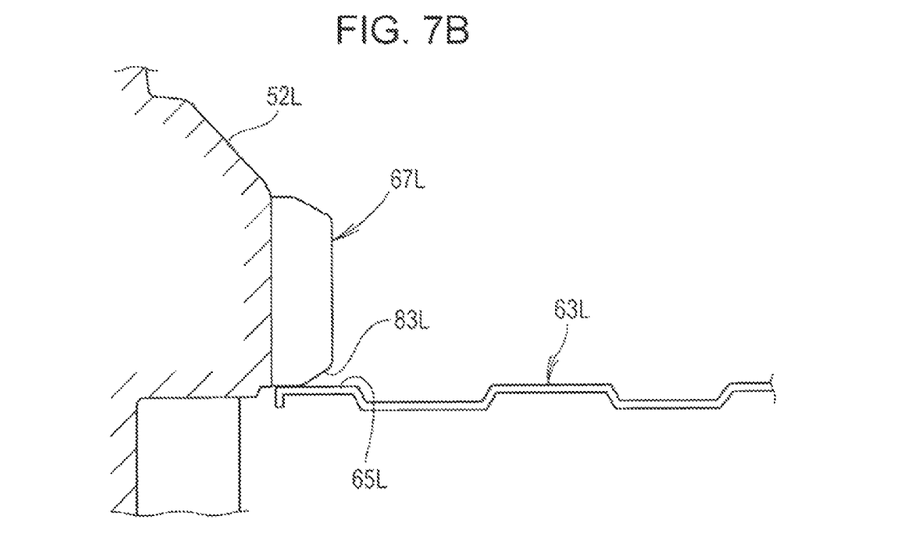

As illustrated in FIGS. 7A and 7B, the stopper surface 83L of the seat stopper 67L includes a lower surface 85L and a sloped surface 87L. The sloped surface 87L extends from the lower surface 85L and is sloped upwards toward the inner side in the width direction of the vehicle. As illustrated in FIG. 7A, the seat back plate 63L is in a state where the seat back plate 63L is slightly lifted. When the seat stopper 67L is moved as illustrated by an arrow (2), the stopper surface 83L comes into contact with the seat back plate 63L. The stopper surface 83L presses down the seat back plate 63L as illustrated by an arrow (3). As illustrated in FIG. 7B, the seat back plate 63L is pressed by the seat stopper 67L to a position where the seat back plate 63L is not lifted.

Returning to FIGS. 6A and 6B, since the hinges 54 are provided in a rear portion of the door 52L, the hinges 54 are positioned close to a position where the folding mechanism 62L is located. When the seat back plate 63L is folded, the closer the seat back plate 63L is positioned to the folding mechanism 62L, the less the seat back plate 63L is lifted. When the door 52L is closed, a position of the door 52L that is close to the hinges 54 first comes into contact with the seat back plate 63L. For this reason, the seat stopper 67L can press the seat back plate where the distance that the seat back plate 63L is lifted is small. As a result, when the door 52L is closed, a load which presses the seat back plate 63L can be reduced, and a force exerted on the door 52L can be reduced.

In the embodiment depicted in the present disclosure, the components on the left side of the vehicle 10 have been described. However, it will be understood that the components on the right side may have the same configuration and operation effects. Moreover, it will be understood that other embodiments may have the components only on one side.

The vehicle according to the present disclosure is suitable for a vehicle equipped with the seat back plate which is forward foldably attached to the seat cushion via the folding mechanism and forms the cargo deck when folded. Likewise, other suitable vehicle arrangements may be used.

It will be appreciated that the foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a vehicle body frame;
seat cushions provided on the vehicle body frame;
seat back plates attached to the seat cushions via folding mechanisms and foldable to form a cargo deck; and
doors openably and closably provided on the vehicle body frame on outer sides of the seat cushions in a width direction of the vehicle,
wherein rear portions of the doors are attached to the vehicle body frame via hinges, and the doors are provided with seat stoppers having lower surfaces which, when the doors are closed, press the seat back plates from above to prevent the seat back plates from being lifted,
wherein the seat stoppers each include a sloped surface extending from the lower surface, the sloped surface sloping upwards toward an inner side in the width direction of the vehicle when the doors are closed.

2. The vehicle according to claim 1,
wherein the seat back plates have upper protrusions, and upper portions of the upper protrusions are protruded to outer sides in the width direction of the vehicle further from lower portions thereof when the seat back plates are raised, and
wherein the upper protrusions are pressed by the seat stoppers when the seat back plates are folded and the doors are closed.

3. The vehicle according to claim 1,
Wherein the sloped surfaces are positioned to contact the seat back plates as the doors are closed.

4. The vehicle according to claim 1,
wherein the doors have recesses.

5. The vehicle according to claim 4,
wherein the recesses are continuously arranged below the seat stoppers, and upper ends of the recesses are connected to the lower surfaces.

6. The vehicle according to claim 1,
wherein the cargo deck has side-portion cargo deck frames on side portions in the width direction of the vehicle,
wherein front portions of the side-portion cargo deck frames are configured to have the doors, and rear portions thereof are configured to have rear-portion frames which are attached to the vehicle body frame,
wherein the doors are attached to the rear-portion frames via the hinges, and
wherein the seat stoppers are arranged on the vehicle further outward in the width direction of the vehicle than an inner surface of the rear-portion frames.

7. The vehicle according to claim 1,
wherein the seat cushions are divided at a center in the width direction of the vehicle to configure a left seat cushion in the left of the vehicle and a right seat cushion in the right thereof,
wherein the vehicle body frame has a rear center frame which is provided between the left seat cushion and the right seat cushion and is extended in the front and rear direction of the vehicle, and
wherein an upper surface of the rear center frame and back surfaces of the folded seat back plates form a substantially continuous surface.

8. The vehicle according to claim 1,
wherein the seat back plates have a wave-shaped cross-section when the seat back plates are viewed in the width direction of the vehicle.

9. A vehicle comprising:
a vehicle body frame;
a seat cushion provided on the vehicle body frame;
a seat back plate foldable from a raised position to a folded position to form a cargo deck;
a door provided on the vehicle body frame on an outer side of the seat cushion in a width direction of the vehicle; and
a seat stopper disposed on the door such that when the door is closed and the seat back plate is in the folded position, a lower surface of the seat stopper overlies the seat back plate to prevent the seat back plate from being lifted, the seat stopper including a sloped surface extending from the lower surface, the sloped surface sloping upwards toward an inner side in the width direction of the vehicle.

10. The vehicle according to claim 9, wherein the sloped surface is positioned to contact the seat back plate as the door is closed.

11. The vehicle according to claim 9, wherein the stopper is configured such that the lower surface of the stopper presses the seat back plate when the door is closed and seat back plate is in the folded position.

12. The vehicle according to claim 9, wherein the cargo deck has a cargo deck frame on a side portion of the vehicle,
wherein the door is disposed on a front portion of the cargo deck frame,
wherein an inner surface of a rear portion of the cargo deck frame defines an extension line, and
wherein the stopper is disposed outwardly from the extension line in the width direction of the vehicle.

13. The vehicle according to claim 9, wherein the seat back plate has a wave-shaped cross-section when the seat back plate is viewed in the width direction of the vehicle, the wave-shaped cross-section defining upper and lower portions when the seat back plate is in the folded position, and wherein the stopper overlies an upper portion of the wave shaped cross-section.

14. The vehicle according to claim 9, wherein the seat back plate has a protrusion extending outwardly in the width direction of the vehicle, wherein the stopper overlies the protrusion when the seat back plate is folded and the door is closed.

15. A vehicle comprising:
a vehicle body frame;
a seat cushion provided on the vehicle body frame;
a seat back plate foldable from a raised position to a folded position to form a cargo deck;
a door provided on the vehicle body frame on an outer side of the seat cushion in a width direction of the vehicle; and
a seat stopper disposed on the door such that when the door is closed and the seat back plate is in the folded position, the seat stopper overlies the seat back plate to prevent the seat back plate from being lifted, wherein the cargo deck has a cargo deck frame on a side portion of the vehicle, wherein the door is disposed on a front portion of the cargo deck frame, wherein an inner surface of a rear portion of the cargo deck frame defines an extension line, and wherein the stopper is disposed outwardly from the extension line in the width direction of the vehicle.

16. The vehicle according to claim 15, wherein the door is attached to the cargo deck frame with a hinge on a rear portion of the door.

17. The vehicle according to claim 15, wherein the seat back plate has a protrusion extending outwardly in the width direction of the vehicle beyond the extension line when the seat back plate is folded.

18. The vehicle according to claim 15, further comprising a striker disposed on the seat back plate.

19. The vehicle according to claim 15, further comprising a center frame extending in a front to rear direction of the vehicle, wherein an upper surface of the center frame and back surface of the folded seat back plate form a substantially continuous surface.

20. The vehicle according to claim 15, wherein the door has a recess on an inner side beneath the stopper.

* * * * *